June 4, 1940.                G. ALLEN                2,203,588
                              HEATER
                         Filed Sept. 6, 1938
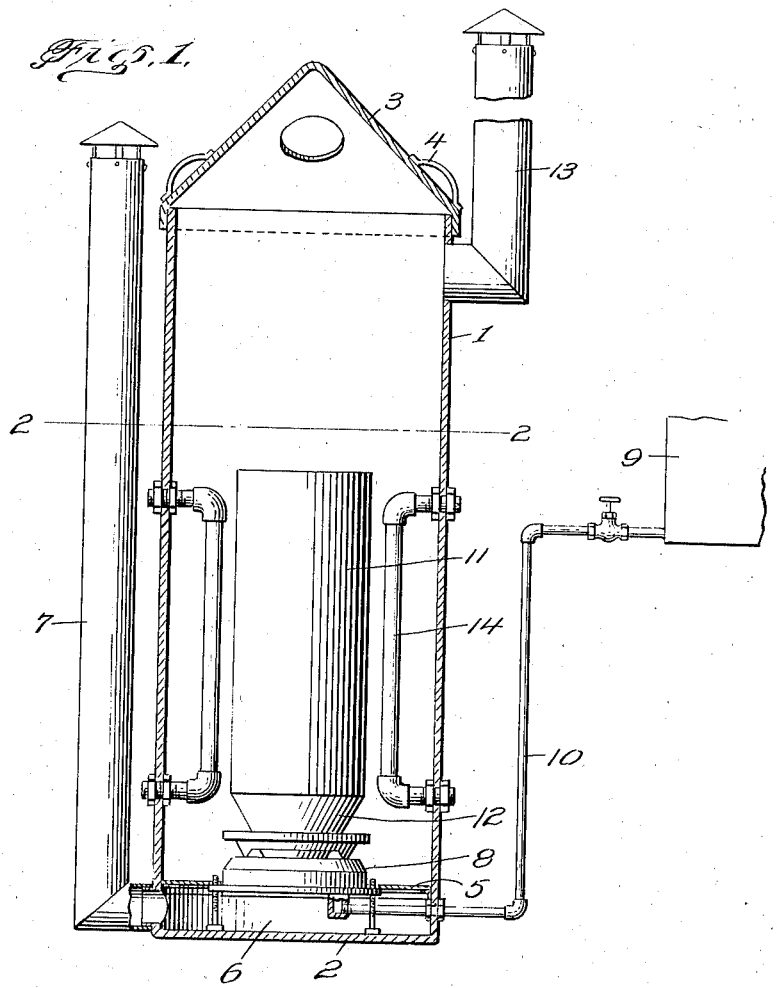
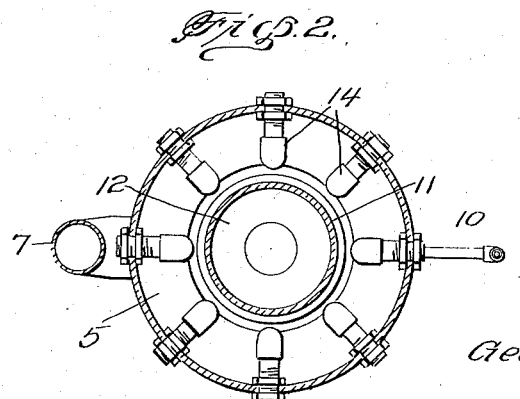

Patented June 4, 1940

2,203,588

UNITED STATES PATENT OFFICE 2,203,588

HEATER

George Allen, Kansas, Ill.

Application September 6, 1938, Serial No. 228,698

1 Claim. (Cl. 126—367)

This invention relates to heaters, and has for the primary object the provision of a portable device of this character which may be employed for heating the contents of drinking troughs, or for heating brooders, rooms and the like, the device embodying a construction which assures maximum efficiency in heating with a minimum consumption of fuel.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation, partly in section, illustrating a heater constructed in accordance with my invention.

Figure 2 is a sectional view taken on the line 2—2 of Figure 1.

Referring in detail to the drawing, the numeral 1 indicates a tubular housing closed at its lower end by a bottom wall 2 and closed at its upper end by a removable cover 3 having hand grips 4 to facilitate the removal and application of the cover from the housing. A transverse partition 5 is located within the housing slightly above the bottom wall 2 to form an air chamber 6 connected with a vent pipe 7 terminating above the upper end of the housing and arranged exteriorly of the latter. The partition 5 supports a liquid fuel burner 8 and the latter is supplied from a fuel tank 9 by a pipe 10 entering the air chamber, as clearly shown in Figure 1. The burner 8 may be of any well known construction. A heat deflector 11 of tubular shape is arranged centrally of the housing and is provided with a conical shaped lower end 12 which is supported by and engageable with the burner 8 for receiving and spreading the flames from the burner outwardly towards the walls of the housing. A flue 13 is connected to the upper end of the housing for carrying off the products of combustion and other fumes.

A plurality of spaced vertically disposed circulating tubes or flues 14 are arranged within the housing and spaced circumferentially around the heat deflector. The flues are coextensive with the tubular upper portion of the heat deflector 11 for their entire length and the transversely disposed end portions thereof are connected to and open through the side wall of the housing to support the flues in spaced relation with the inner wall of the housing and the heat deflector but in closer proximity to the heat deflector.

When desiring to heat the contents of a drinking trough or like device, the housing 1 is partly submerged in the contents of the trough so that the contents may circulate through the tubes 14 and in a direct path of movement of the flames from the burner so that the contents of the trough will be quickly heated. Also the contents will absorb the heat from the walls of the housing. Air is fed into the air chamber 6 by the vent 7 so as to furnish sufficient air to the burner for the proper burning of the fuel. While this device has been described in operation for heating the contents of a trough or the like it also may be used for heating a brooder, room or like device by simply being positioned in the room and set in operation.

What is claimed is:

A heater of the type adapted to be at least partially submerged in a liquid to heat the surrounding media, comprising a substantially enclosed cylindrical tank, a heating means positioned centrally within the tank and spaced above the bottom thereof to provide an air space therebelow, means to convey atmospheric air from above the surface of the liquid to the said air space, a tubular heat deflector arranged concentrically within the tank and formed with a convergent lower portion supported by the heating means, and a plurality of water circulating flues arranged within the housing and spaced circumferentially around the heat deflector, the said flues being positioned in spaced parallelism with the heat deflector for their entire length and maintained in spaced relation with the inner wall of the housing and with the heat deflector but in closer proximity to the heat deflector by transversely bent end portions which connect to and open through the side wall of the housing below the surface of the said liquid.

GEORGE ALLEN.